Jan. 3, 1961 C. S. HERRICK 2,967,115

METHOD OF DEPOSITING SILICON ON A SILICA COATED SUBSTRATE

Filed July 25, 1958

Inventor:
Carlyle S. Herrick,
by Joseph T. Cohen
His Attorney.

United States Patent Office 2,967,115

Patented Jan. 3, 1961

2,967,115

METHOD OF DEPOSITING SILICON ON A SILICA COATED SUBSTRATE

Carlyle S. Herrick, Alplaus, N.Y., assignor to General Electric Company, a corporation of New York Filed July 25, 1958, Ser. No. 751,089

6 Claims. (Cl. 117—46)

Figure 1:
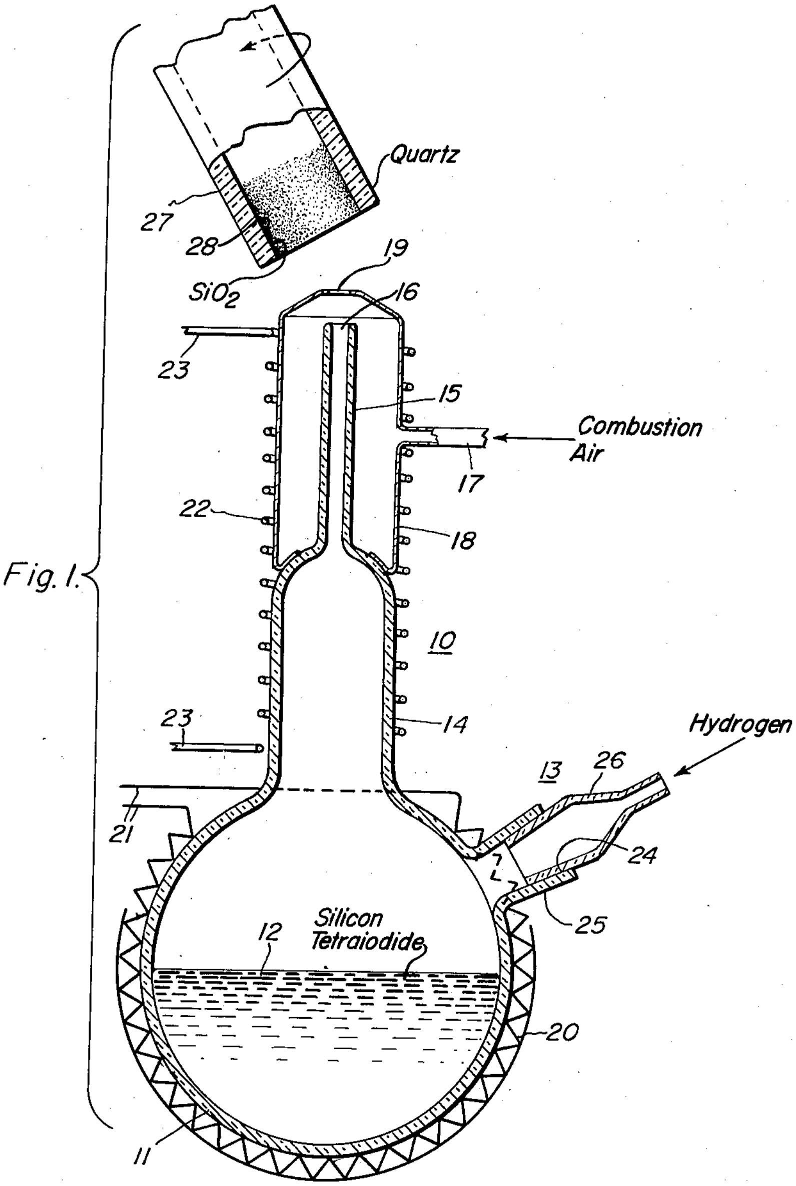

This invention relates to a diffusion barrier film-release agent, and more particularly, to a diffusion barrier-release agent film employed in the production of silicon by the decomposition of silicon compounds.

In my copending application, S. N. 751,088, filed July 25, 1958, assigned to the same assignee as the present invention and filed concurrently herewith, there is disclosed a method and apparatus for the production of silicon in large quantities and in various configurations including tubular or cylindrical. That process is generally described as the deposition of silicon upon a heated surface element from the decomposition of silicon tetraiodide. Such a surface element should be of a material which is not only substantially pure, but also one which is inert with respect to silicon. Where substantially pure silicon has been employed for such a heated surface element, no particular problems have arisen. It has been found, however, that when practicing the process of the above-mentioned copending application, and employing quartz or tantalum as the heated surface element, that special problems have become associated with the use of each of these materials.

With respect to quartz, it has been found that the use thereof introduces some impurities into the silicon being deposited since the average purity level of the quartz is much lower than that of the silicon. Furthermore, the depositing of silicon adheres tenaciously to the quartz and subsequent attempts to separate the materials results in breakage of the quartz and silicon.

With respect to tantalum as the heated surface element, it has been found that both tantalum itself and substantial impurities from the tantalum are readily introduced into the silicon for a reduction in the otherwise high purity condition of the silicon being deposited.

It is, therefore, understood that a coating on quartz or tantalum is desirable where the coating acts in one instance as a diffusion barrier to prevent the diffusion of impurities from the quartz or tantalum into the deposited silicon, and in another instance, as an intermediate agent to which the silicon does not readily adhere, i.e., a release agent for silicon.

Accordingly, it is an object of this invention to provide a diffusion barrier film release agent between depositing silicon and the surface element upon which the silicon is being deposited.

It is another object of this invention to provide a release agent coating between the depositing silicon and the quartz surface upon which the silicon is being deposited.

It is another object of this invention to provide an improved diffusion barrier film upon a tantalum heated surface element upon which silicon is to be deposited.

While this specification concludes with claims particularly pointing out and distinctly claiming the subject matter of my invention, it is believed this invention will be better understood from the following description taken in connection with the accompanying drawing in which:

Fig. 1 shows the general apparatus employed to provide the film coating of this invention.

Briefly described, this invention in one form includes coating a surface, upon which silicon is to be deposited from the decomposition of silicon compounds, with an impurity diffusion barrier-release agent film coating, for example, silicon dioxide, $SiO_2$, the coating being applied also by deposition and constituting a diffusion barrier-release agent film between the heated surface and the deposited silicon.

While the coating of this invention may be applied to numerous silicon depositing surface elements of various materials, the invention will be descriptively related to those surface element materials in more frequent use, for example, tantalum and quartz. The invention is not limited to the coating of a surface element in only the process described in my copending application, that is the thermal decomposition of silicon tetraiodide, but may be equally employed in other silicon processes, for example, hydrogen reduction of $SiHCl_3$, thermal decomposition of $SiHCl_3$, hydrogen reduction of $SiCl_4$, hydrogen reduction of $SiBr_4$, hydrogen reduction of silicon tetraiodide, and thermal reduction of $SiBr_4$, $SiH_4$, etc.

Tantalum is often employed as the heated surface element since the tantalum-silicon alloy formed at the interface is brittle and allows ready separation of the two materials at the interface based on the different coefficients of thermal expansion. Secondly, tantalum is employed because the material has a high melting point and a low rate of diffusion into silicon. In my copending prior application, as above-mentioned, there is disclosed the use of tantalum in cylindrical or tubular form for the production of a polycrystalline cylinder of silicon. It has been found that although the process results in a very high purity silicon, the tantalum introduces substantial impurities to the silicon by solid state diffusion, such impurities, for example, being tantalum and arsenic. It is evident, therefore, that the process or the end result silicon may be much purer if the tantalum, containing impurities, could be prevented from contaminating the depositing silicon.

Quartz is also employed as the heated surface element because the material is inert with respect to silicon and may be of substantial purity. However, as in the case of tantalum, quartz also introduces some impurities to the otherwise substantially pure depositing silicon and the aforementioned problem of the tenacious adherence of silicon to quartz is present.

It has been discovered that when heated surface elements, particularly quartz and tantalum, are coated with a thin film of silicon dioxide, $SiO_2$, there is provided an efficient diffusion barrier which substantially prevents solid-state diffusion of impurities from these surfaces to the deposited silicon. A further important feature of the film is, that when applied to a quartz surface, strong attachment of silicon to the quartz is prevented by the mechanically weak $SiO_2$ intermediate layer. Thus, when silicon is deposited, for example, inside a quartz tube coated with a thin film of $SiO_2$, the depositing silicon does not contact the quartz surface, and upon cooling, the silicon shrinks from the quartz, separation being possible without damage to either material.

It is an important aspect of the $SiO_2$ coating that it be as pure as the silicon deposited in order to avoid contaminating the silicon. While it is understood that quartz in itself is essentially $SiO_2$, the film coating of $SiO_2$ as described in this invention is intended to include a further ultra-pure $SiO_2$ film type of coating. Ultra-pure $SiO_2$ is prepared in situ by burning small amounts of purified silicon tetraiodide in precleaned air together with small amounts of precleaned hydrogen, and thereafter exposing the quartz material to the products of combustion which results in a deposited film on the quartz surface. By the use of such a coating, and particularly on hollow tantalum cylinders, the more desirable form of silicon, tubular or cylindrical, and of high purity, may be produced by this process. This would essentially eliminate, to some degree, the zone refining or float leveling processes which are additionally employed to further purify the silicon made from other processes.

The method of coating a surface in accordance with the teachings of this invention is better described in relation to the apparatus as illustrated in Fig. 1. Referring now to Fig. 1, the apparatus, shown generally as 10, comprises a chamber or vessel 11 containing a silicon halide, for example, silicon tetraiodide 12. Vessel 11 includes an inlet 13, a reduced portion 14, and an adjacent thin necked section 15 provided with an exit aperture 16. The vessel 11 is employed to vaporize silicon tetraiodide 12, and to mix the silicon tetraiodide vapor with hydrogen entering through inlet 13. The hydrogen and silicon tetraiodide vapor mixture is further mixed with combustion air entering the inlet 17 of an enclosure 18 to thereafter flow from a final exit 19 for combustion thereof.

The silicon tetraiodide 12 in vessel 11 is prepared by the technique described in my aforementioned copending application by the reaction of silicon particles and iodine vapor in a fluid bed, and purification by recrystallization and distillation until the impurity content is in the general range of 1 part per hundred billion or lower.

Combustion air is prepared by passing air over silica gel for removal of organic matter and water vapor and then passing the clean air through a fine particle filter such as, for example, glass wool.

The hydrogen utilized in this invention is described in one form as electrolytic hydrogen which is deoxidized, dried by passing over silica gel, and then passed through a fine particle filter such as glass wool.

In order to vaporize the silicon tetraiodide 12 in vessel 11, vessel 11 is encased in or alternately exposed to some form of heating, for example, as illustrated, by a heating mantle 20 which includes electrical resistance heating elements. These elements are connected to a suitable source of power, not shown, by connecting leads 21. With the heating mantle 20 in operation, the silicon tetraiodide is heated until the boiling point, about 30° C., is reached, and vapor is formed. The amount of silicon tetraiodide vapor generated is generally determined by the boiling rate of the silicon tetraiodide. Thereafter, hydrogen gas enters the inlet 13 to mix with silicon tetraiodide vapor. An additional heater 22 surrounds the tube portion 14 and necked section 15 of vessel 11 to maintain the temperature of the hydrogen and silicon tetraiodide vapor to a degree sufficient to prevent condensation of the silicon tetraiodide and consequent plugging of the necked section 15. Heater 22 may also be of the electrical resistance type to be connected to a suitable source of power, now shown, by means of the connecting leads 23. Hydrogen inlet 13 includes a ground joint connection or surface 24 between the lip 25 and the plug 26 which acts as a relief valve if plugging of the necked section 15 or the exit 16 thereof occurs. Other suitable forms of relief valves may be also employed to provide the same result. The hydrogen and silicon tetraiodide vapor mixture rises through the tube portion 14 of vessel 11 and proceeds through the necked section 15 of vessel 11 to flow from exit 16.

In order to provide combustion air for the hydrogen and silicon tetraiodide vapor mixture, the enclosure 18 is fitted about the necked section 15 of vessel 11 to serve as a type of plenum chamber or cavity. Combustion air enters through the entrance 17 and surrounds the necked section 13 of vessel 11 to flow through exit 19 of enclosure 18. Previous to exiting from exit 19, the combustion air mixes with the hydrogen silicon tetraiodide vapor and a combustible mixture is obtained.

At the start of the operation of this system, a mixture of hydrogen and air alone is provided through exit 19 and ignited. Particular proportions of the gases leaving the final exit 19 are not critical and a reasonably wide latitude of adjustment is permissible. The amount of hydrogen is adjusted to provide a flame length at about half as high as the length of the object to be coated. The volume of combustion air is then adjusted to produce an inner flame core that is relatively short in comparison to flame height. Good results have been obtained with an inner flame core about 20% of flame height.

After ignition of the hydrogen and air, the heating mantle 20 is energized to increase the temperature of the silicon tetraiodide to its boiling point. Thereafter, the boiling rate is increased until the inner core of the flame extends to about full flame length and becomes quite yellow. At this point, purple fumes of elemental silicon are visible in the air above the flame.

The object to be coated is, as an illustrative example, a quartz cylinder 27, and is positioned above the exit 19 to provide an impinging of the tip of the flame on the site to be coated.

While it is known that the surface properties of the $SiO_2$ deposited on the quartz cylinder 27 are effected by the proportions of air, hydrogen, and silicon tetraiodide vapor, no important effect of these properties has been noted on the silicon deposited by the teachings of this invention. However, it is preferred to maintain the air to hydrogen flow ratio as small as practical in order to produce a silica deposit having a low surface area per gram. Using the adjustments as heretofore described, a film coating of $SiO_2$ may be deposited on the quartz cylinder at about 0.01 inch thick on those areas directly impinged by the tip of the flame. Such coating is formed in a matter of seconds after suitable exposure. The point of impingement may then be shifted about the surface until the entire article, or any part thereof, is covered with the silica, $SiO_2$, coating. It is understood by those skilled in the art that the described process provides what may be generally referred to as an unfused or unvitrified coating, or a finely divided amorphous coating.

Previous to coating the quartz cylinder 27, it is desirable that the coating surfaces be clean and dry in the ordinary sense. Accumulations of dirt and grease or any other materials which will give off gases when heated in a flame will cause blisters in the $SiO_2$ coating and prevent achieving a satisfactory and continuous film.

When this particular $SiO_2$ coating is employed as a liner between depositing silicon and a quartz cylinder, the coating is generally rendered useless by each individual complete deposit and must be renewed at the conclusion of each run. The $SiO_2$ and the silicon deposited react slowly at high temperatures, about 1000° C., and under vacuum, to form SiO which has appreciable vapor pressure and thus evaporates into the vacuum train. Otherwise, the coating is of a durable and permanent nature except for mechanical damage such as scratching, gouging, or exposure to a high velocity gas stream, etc.

The chemical composition of the silicon dioxide deposit formed in accordance with the teachings of this invention is known to contain a large number of surface hydroxyl groups, and when heated to about a thousand degrees in vacuum, most of the hydroxyl groups react to form $SiO_2$, and water which evaporates. A sufficient number of hydroxyl groups remain to provide good adhesion to the quartz surface even at these high temperatures.

The coating of this invention may well be formed as a part of the silicon depositing process as described and claimed in the aforementioned copending application. The chemistry involved remains generally the same, with the exception that a flame is not necessary to provide the chemical reactions. For example, one method of coating a clean quartz cylinder in the silicon decomposition process includes condensing a layer of water molecules on the quartz surface, thereafter condensing a layer of silicon tetraiodide molecules on the quartz surface, heating the surface to about 1000° C. to aid in the completion of the reaction, and then repeating these steps till a sufficiently thick coating has accumulated. This method is generally satisfactory for lighter coatings.

It should also be apparent that other coatings which provide effective diffusion barrier films and which do not in themselves introduce substantial impurities into the silicon may also be employed within the scope of this invention.

While other coatings and modifications of the coating of this invention may be employed within the scope thereof and have not been described, the invention is intended to include all such as may be embraced within the following claims.

What I claim as new and desire to secure by Letters Patent of the United States is:

1. In the decomposition of silicon from silicon compounds upon a surface element, the improvement which comprises coating the surface element with an impurity diffusion barrier-release agent film, said coating including vaporizing a silicon halide, heating said halide vapor for decomposition thereof to form a finely divided amorphous layer of silica on a surface element, and thereafter depositing elemental silicon on said layer.

2. The invention as claimed in claim 1 wherein said element is quartz.

3. The invention as claimed in claim 1 wherein said element is tantalum.

4. In a process of thermally decomposing a silicon halide upon a heated surface for the deposition of elemental silicon thereon, the method of precoating said surface with a film of $SiO_2$ which includes the steps of heating a silicon tetraiodide above its boiling point to form silicon tetraiodide vapor, mixing said vapor with hydrogen, introducing air to said hydrogen and silicon tetraiodide vapor to form a combustible mixture, igniting said mixture, exposing said surface to the flame of combustion for the deposition of $SiO_2$ thereon in the form of a finely divided amorphous coating and thereafter depositing elemental silicon on the $SiO_2$ coating.

5. In the process of thermally decomposing silicon tetraiodide upon a heated surface for the deposition of silicon thereon, the method of precoating said surface with $SiO_2$ which comprises, condensing a layer of water molecules on said surface, condensing a layer of silicon tetraiodide vapor on said surface, and heating the surface to about 1000° C. to complete the chemical reaction to form $SiO_2$ on said surface and thereafter employing said surface for the deposition thereon of elemental silicon from the thermal decomposition of a silicon halide.

6. In a process of thermally decomposing a silicon halide upon a heated surface for the deposition of elemental silicon thereon, the method of precoating said surface with a film of $SiO_2$ which includes the steps of, heating a silicon halide to form a vapor, passing said vapor through a flame of combustion, exposing said surface to the said flame of combustion for the deposition of $SiO_2$ thereon in the form of a finely divided amorphous coating, and thereafter depositing elemental silicon on the $SiO_2$ coating from the thermal decomposition of a silicon halide.

References Cited in the file of this patent

UNITED STATES PATENTS

| | | |
|---|---|---|
| 2,272,342 | Hyde | Feb. 10, 1942 |
| 2,419,966 | Ransley | May 6, 1947 |
| 2,771,378 | Motter | Nov. 20, 1956 |
| 2,798,792 | Stelling | July 9, 1957 |

FOREIGN PATENTS

| | | |
|---|---|---|
| 167,513 | Australia | Apr. 20, 1956 |

UNITED STATES PATENT OFFICE

CERTIFICATION OF CORRECTION

Patent No. 2,967,115 January 3, 1961

Carlyle S. Herrick

It is hereby certified that error appears in the above numbered patent requiring correction and that the said Letters Patent should read as corrected below.

Column 3, line 42, for "30° C." read -- [illegible]° C. --; line 53, for "now" read -- not --; column 4, line 13, for "silicon" read -- iodine --; line 46, for "deposit ng" read -- depositing --; column 5, line 17, for "of" read -- to --.

Signed and sealed this 13th day of June 1961.

(SEAL)
Attest:

ERNEST W. SWIDER
Attesting Officer

DAVID L. LADD
Commissioner of Patents